United States Patent
Sakamoto et al.

(10) Patent No.: US 9,643,472 B2
(45) Date of Patent: May 9, 2017

(54) AIR-CONDITIONER FOR VEHICLE

(75) Inventors: Saburo Sakamoto, Obu (JP);
Shinichirou Hirai, Ichinomiya (JP);
Masashi Watanabe, Kariya (JP);
Koichi Tabei, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 596 days.

(21) Appl. No.: 14/112,607

(22) PCT Filed: Apr. 9, 2012

(86) PCT No.: PCT/JP2012/002455
§ 371 (c)(1),
(2), (4) Date: Oct. 18, 2013

(87) PCT Pub. No.: WO2012/144153
PCT Pub. Date: Oct. 26, 2012

(65) Prior Publication Data
US 2014/0045417 A1   Feb. 13, 2014

(30) Foreign Application Priority Data
Apr. 19, 2011   (JP) .................. 2011-093280

(51) Int. Cl.
*B60H 1/00* (2006.01)

(52) U.S. Cl.
CPC ..... *B60H 1/00878* (2013.01); *B60H 1/00028* (2013.01); *B60H 1/00849* (2013.01); *B60H 2001/00085* (2013.01)

(58) Field of Classification Search
CPC ............ B60H 1/00849; B60H 1/00864; B60H 1/00828; B60H 1/00764; B60H 1/00878
(Continued)

(56) References Cited

U.S. PATENT DOCUMENTS

| 5,699,960 A | 12/1997 | Kato et al. |
| 6,253,841 B1 * | 7/2001 | Obara ................ B60H 1/00849 165/204 |
| 2010/0035534 A1 | 2/2010 | Kajiya |

FOREIGN PATENT DOCUMENTS

| FR | DE 19963796 A1 * | 7/2000 | ......... B60H 1/00849 |
| JP | U59-185117 | 12/1984 | |

(Continued)

OTHER PUBLICATIONS

English tanslation of Abstract of the DE 19963796A1.*
(Continued)

*Primary Examiner* — Helena Kosanovic
(74) *Attorney, Agent, or Firm* — Harness, Dickey & Pierce, P.L.C.

(57) ABSTRACT

A control part controls a first opening-and-closing part to close either one of a first outside air introduction port and a first inside air introduction port when it is determined that outside air introduced from the first outside air introduction port flows into a passenger compartment through the first inside air introduction port, and controls a second opening-and-closing part to close either one of a second outside air introduction port and a second inside air introduction port when it is determined that outside air introduced from the second outside air introduction port flows into the passenger compartment through the second inside air introduction port.

5 Claims, 8 Drawing Sheets

(58) Field of Classification Search
 USPC .......................................................... 454/143
 See application file for complete search history.

(56) References Cited

FOREIGN PATENT DOCUMENTS

| JP | H07-251630 A | 10/1995 |
| JP | 08-318727 A | 12/1996 |
| JP | H09-142133 A | 6/1997 |
| JP | 2010-36834 A | 2/2010 |

OTHER PUBLICATIONS

International Search Report for PCT/JP2012/002455, ISA/JP, mailed Jun. 12, 2012, with English translation thereof.
Written Opinion of the ISA for PCT/JP2012/002455, ISA/JP, mailed Jun. 12, 2012, with English Translation thereof.
Office Action dated Jan. 13, 2015 in corresponding German Application No. 11 2012 001757.
Office Action dated Apr. 3, 2015 in corresponding Chinese Application No. 201280019562.X.

* cited by examiner

| MODE | DOOR POSITION (PULSE VALUE) | BACKFLOW PREVENTING MODE |
|---|---|---|
| OUTSIDE AIR MODE | 100 | (NO BACKFLOW) |
| FIRST MIDDLE MODE | 51 – 99 | OUTSIDE AIR MODE |
| TWO-LAYER MODE | 50 | (NO BACKFLOW) |
| SECOND MIDDLE MODE | 1 – 49 | TWO-LAYER MODE |
| INSIDE AIR MODE | 0 | (NO BACKFLOW) |

AIR-CONDITIONER FOR VEHICLE

CROSS REFERENCE TO RELATED APPLICATION

This application is a 371 National Phase of PCT/JP2012/002455, filed Apr. 9, 2012, based on Japanese Patent Application No. 2011-93280 filed on Apr. 19, 2011, the disclosures of which are incorporated herein by reference.

TECHNICAL FIELD

This disclosure is related to an air-conditioner for a vehicle.

BACKGROUND ART

A conventional air-conditioner for a vehicle is disclosed in which air is sent into a passenger compartment by two fans coaxially arranged (for example, refer to Patent document 1). The air-conditioner described in Patent document 1 has a first fan and a second fan sending air by being supplied with rotation power from a drive source, and a case having a first introduction port and a second introduction port which introduce both inside air and outside air. Each of the introduction ports has an inside air introduction port and an outside air introduction port, and an opening and closing door is provided to switch the outside air introduction port and the inside air introduction port to open or close. In the case, a first air passage extending toward the first fan from the first introduction port and a second air passage extending toward the second fan from the second introduction port are defined independently from each other.

In the air-conditioner, if the opening and closing door can be positioned at an intermediate position where both inside air and outside air are introduced, the introductory rate of inside air can be reduced gradually, and the introductory rate of outside air can be increased gradually, for example, according to a change in a target value for a blow-off air temperature into the passenger compartment from low temperature to high temperature. At such a mode where both the inside air introduction port and the outside air introduction port are opened, if the speed of the vehicle is raised, a large pressure will be applied to the upstream part of the outside air introduction port. As a result, outside air may flow gradually through the inside air introduction port toward an occupant in the passenger compartment directly without being air-conditioned as a backflow.

It is known that the inside air introduction port is closed if a voltage impressed to the blower is smaller than a specified value, at such a mode where both of the inside air introduction port and the outside air introduction port are opened. When the blower voltage is higher than or equal to the specified value, outside air can be compulsorily drawn into an air conditioning unit by the blower even if the pressure loss in the air conditioning unit is large, therefore the backflow can be prevented. When the blower voltage is smaller than the specified value, the backflow may be generated because the pressure loss is large in the air conditioning unit and because a power of the blower compulsorily drawing outside air is weak (for example, refer to Patent document 2).

Art described in Patent document 2 is related with a backflow prevention in case there is only one air passage in an air-conditioner, and there is no suggestion as to a control for preventing a backflow in the case of Patent document 1 where the air-conditioner has two passages independent from each other.

RELATED ART DOCUMENT

Patent Document

Patent document 1: JP-2010-36834A
Patent document 2: JP-H07-251630A

SUMMARY OF THE INVENTION

It is an object of this disclosure to provide an air-conditioner for a vehicle in which a backflow is restricted in an air passage.

According to a first aspect of the present disclosure, an air-conditioner for a vehicle includes a case having a first outside air introduction port and a second outside air introduction port which introduce outside air, and a first inside air introduction port and a second inside air introduction port which introduce inside air;

a first opening-and-closing part which switches the first outside air introduction port and the first inside air introduction port to open or close and is capable of opening both of the first outside air introduction port and the first inside air introduction port;

a second opening-and-closing part which switches the second outside air introduction port and the second inside air introduction port to open or close and is capable of opening both of the second outside air introduction port and the second inside air introduction port;

a blower arranged in the case; and a control part which controls an opening-and-closing state of the first opening-and-closing part and an opening-and-closing state of the second opening-and-closing part, the blower has a rotation shaft extending in an up-and-down direction in the case, a first fan coupled to the rotation shaft, and a second fan coupled to the rotation shaft on a lower side rather than the first fan, the case has a first air passage extending toward the first fan from the first outside air introduction port and the first inside air introduction port and a second air passage extending toward the second fan from the second outside air introduction port and the second inside air introduction port independently from each other, the control part controls the first opening-and-closing part to close either one of the first outside air introduction port and the first inside air introduction port when it is determined that the outside air introduced from the first outside air introduction port flows into a passenger compartment through the first inside air introduction port, and controls the second opening-and-closing part to close either one of the second outside air introduction port and the second inside air introduction port when it is determined that the outside air introduced from the second outside air introduction port flows into the passenger compartment through the second inside air introduction port.

In the case, the first air passage extending toward the first fan from the first outside air introduction port and the first inside air introduction port and the second air passage extending toward the second fan from the second outside air introduction port and the second inside air introduction port are formed independently from each other. Because the first air passage and the second air passage are formed independently from each other, a ratio of the outside air to the inside air can be individually adjusted in each of the air passages by each of the opening-and-closing parts. However, in a case where both of the outside air introduction port and the inside air introduction port are in open state, when the vehicle speed is raised, etc., the pressure of the introduced outside air becomes high, in this case, there is a possibility that the outside air introduced from the outside air introduction port may flow into a passenger compartment through the inside air introduction port (as a backflow). The control part controls the first opening-and-closing part to close either one of the first outside air introduction port and the first inside air introduction port when it is determined that the backflow will occur in the first air passage. Because one of the introduction ports is closed, the backflow can be prevented. Similarly, the control part controls the second opening-and-closing part to close either one of the second outside air introduction port and the second inside air introduction port when it is determined that the backflow will occur in the second air passage. Because one of the introduction ports is closed, the backflow can be prevented.

Moreover, the control part
controls the first opening-and-closing part to close one of the first outside air introduction port and the first inside air introduction port where a time period taken for closing after the first opening-and-closing part starts operating is shorter when it is determined that the outside air introduced from the first outside air introduction port flows into the passenger compartment through the first inside air introduction port, and controls the second opening-and-closing part to close one of the second outside air introduction port and the second inside air introduction port where a time period taken for closing after the second opening-and-closing part starts operating is shorter when it is determined that the outside air introduced from the second outside air introduction port flows into the passenger compartment through the second inside air introduction port.

When it is determined that a backflow will be generated, the control part controls the opening-and-closing part to close the outside air introduction port or the inside air introduction port introduction port where the time period taken for closing after the opening-and-closing part starts operating is shorter. Therefore, the time period taken for closing after the determination can be made short. Thus, the backflow can be prevented from being generated earlier. Moreover, when the opening-and-closing part generates noise in the operation time, the noise generation period can be shortened. Moreover, the power necessary for the operation of the opening-and-closing part can also be reduced.

Further, at least a part of air sent from the blower is blown toward an inner surface of a windshield of the vehicle and downward in the passenger compartment, an amount of the air blown toward the inner surface of the windshield by the first fan is larger than that by the second fan, an amount of the air blown downward in the passenger compartment by the second fan is larger than that by the first fan, and the control part controls the first opening-and-closing part to close the first inside air introduction port when the second outside air introduction port is closed by the second opening-and-closing part in case where it is determined that the outside air introduced from the first outside air introduction port flows into the passenger compartment through the first inside air introduction port.

In the case where it is determined that the outside air will flow out through the first inside air introduction port, when the second outside air introduction port is in the closed state by the second opening-and-closing part, the control part controls the first opening-and-closing part to close the first inside air introduction port. It is effective to ventilate air containing much outside air from the first fan for restricting the windshield from fogging. Moreover, in order to improve air conditioning efficiency, it is desirable to increase the ratio of the inside air which was already air-conditioned. Then, according to the present disclosure, the inside air is introduced in the passenger compartment because the second opening-and-closing part closes the second outside air introduction port. When there is a possibility that a backflow may be generated in the first air passage, the control part controls the first inside air introduction port into the closed state so as to secure the anti-fogging effect in addition to the restriction of the backflow. Thus, the backflow can be prevented, the air conditioning efficiency can be restricted from being lowered, and the anti-fogging effect can be attained.

Furthermore, at least a part of air sent from the blower is blown toward an inner surface of a windshield of the vehicle and downward in the passenger compartment, an amount of the air blown toward the inner surface of the windshield by the first fan is larger than that by the second fan, an amount of the air blown downward in the passenger compartment by the second fan is larger than that by the first fan, and the control part controls the second opening-and-closing part to close the second inside air introduction port when the first inside air introduction port is closed by the first opening-and-closing part in case where it is determined that the outside air introduced from the second outside air introduction port flows into the passenger compartment through the second inside air introduction port.

In the case where it is determined that the outside air will flow out through the second inside air introduction port, when the first inside air introduction port is in the closed state due to the first opening-and-closing part, the control part controls the second opening-and-closing part to close the second inside air introduction port. It is effective to ventilate air including much outside air into the passenger compartment from not only the first fan but also the second fan for immediate prevention and elimination of fogging on the windshield. Then, according to the present disclosure, when there is a possibility that a backflow will occur in the second air passage, the second inside air introduction port is closed by the second opening-and-closing part, not only by the first opening-and-closing part, so as to prevent the backflow, and the anti-fogging effect can be attained by the outside air introduction from the two outside air introduction ports.

EMBODIMENT OF PRACTICE THE INVENTION

Figure 1:
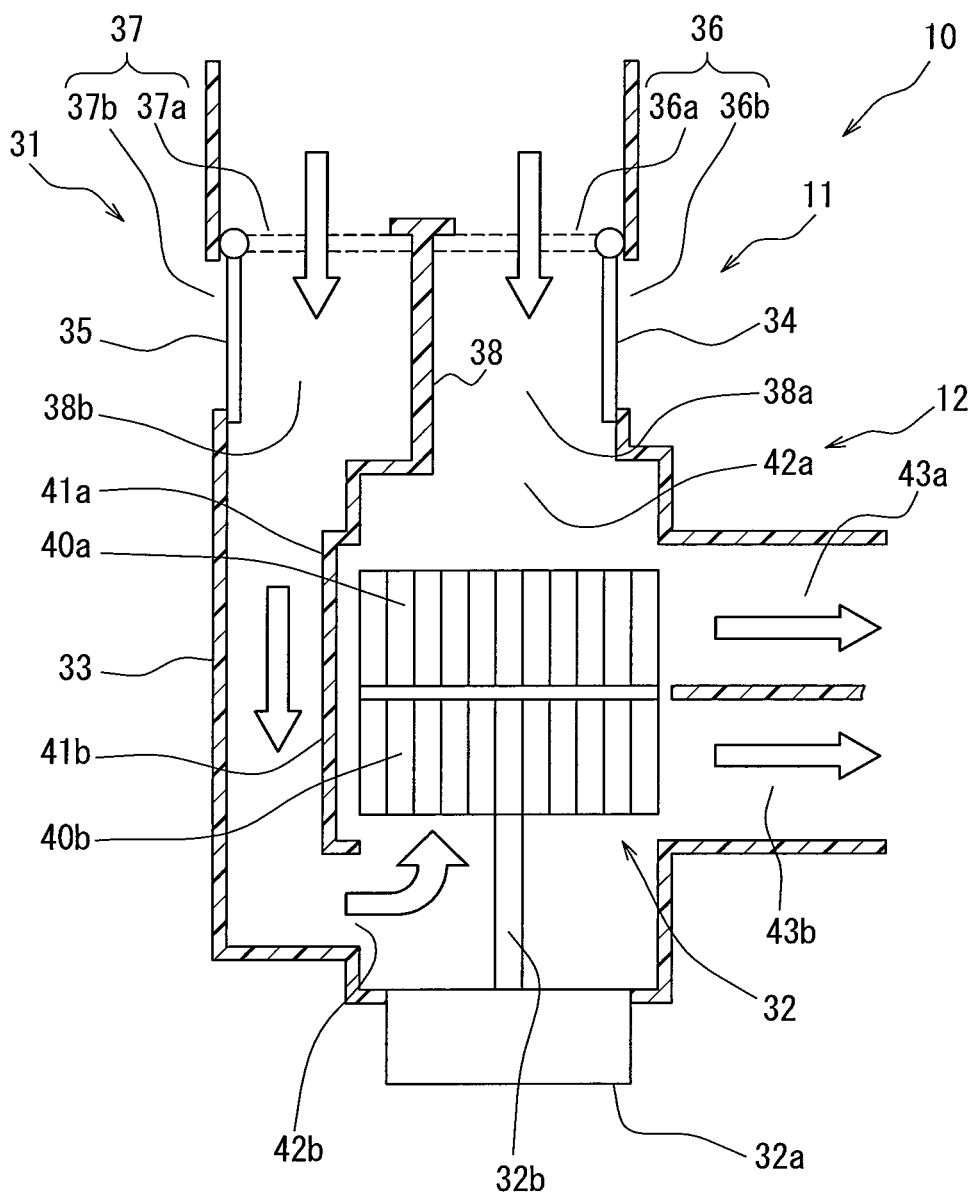
FIG. 1 is a cross-sectional view illustrating a state of an air-conditioner for a vehicle at an outside air mode.

An embodiment will be described with reference to FIGS. 1-10. An up-and-down direction in FIGS. 1-5 is approximately parallel with the vertical direction in the state where it is mounted to a vehicle.

An indoor unit 11 of an air-conditioner 10 for a vehicle mainly includes a blower unit 12 which sends air toward a passenger compartment, and an air conditioning unit (not shown) which adjusts the temperature of the air sent from the blower unit 12.

Moreover, the indoor unit 11 is arranged in a space between a dash panel which divides an engine compartment from the passenger compartment and an instrument panel (instrument board) located the most front in the passenger compartment. More specifically, the air conditioning unit is arranged at the approximately center section of the space in a vehicle width direction, and the blower unit 12 is located offset toward a passenger seat side with respect to the air conditioning unit.

The upper end part of the instrument panel is fixed to the dash panel in the tightly contact state, and the lower end part of the instrument panel is distanced from the dash panel. Therefore, a lower side of the space between the dash panel and the instrument panel is opened to an occupant space in the passenger compartment.

An air passage is defined inside the air conditioning unit which is not illustrated, and the air sent from the blower unit 12 flows through the air passage. A cooling heat exchanger which cools the air, a heating heat exchanger which reheats the air cooled by the cooling heat exchanger, and an air mix door which adjust the amount of the cooled air to be reheated by the heating heat exchanger are arranged in the air passage.

Specifically, the cooling heat exchanger is an evaporator of a vapor compression refrigerating cycle, and the heating heat exchanger is a heater core which heats the air using engine cooling water as a heat source. The air mix door is a temperature adjustment part which adjusts the temperature of the air by continuously changing the opening degree so as to continuously change the ratio of the air amount which passes through the heater core and the air amount which bypasses the heater core, relative to the air cooled by the evaporator. The air mix door is driven by an actuator for air mix door (refer to FIG. 6). The actuator 21 for air mix door is controlled by a control signal output from an air-conditioning controller 30.

The air with the temperature controlled in the air conditioning unit is sent into the passenger compartment from an air outlet defined in the passenger compartment through an opening defined at the most downstream of the air conditioning unit and an duct. Specifically, the conditioned air is sent toward a face of an occupant from a face air outlet, toward leg and foot of an occupant from a foot air outlet, and toward an inner surface of a front windshield from a defroster air outlet. The defroster air outlet is opened and closed by a defroster door. The face air outlet is opened and closed by a face door. The foot air outlet is opened and closed by a foot door. The defroster door, the face door, and the foot door construct an air outlet mode door, and are driven by an actuator 22 for outlet mode door through a link mechanism which is not illustrated (refer to FIG. 6). The actuator 22 for outlet mode door is controlled by a control signal output from the air-conditioning controller 30.

The blower unit 12 shown in FIG. 1 integrally includes an inside/outside air switch device 31 which introduces inside air and/or outside air by switching, and a blower 32 which sends the inside air and/or the outside air introduced by the inside/outside air switch device 31 toward the air conditioning unit. In the example of FIG. 1, the inside/outside air switch device 31 is arranged on the upper side, and the blower 32 is arranged on the lower side.

The inside/outside air switch device 31 includes a case 33, a first door 34, and a second door 35. The case 33 forms an outer shape of the inside/outside air switch device 31. The case 33 is made of resin (such as polypropylene) having a certain elasticity and an outstanding strength. Although not illustrated, after plural parts constructing the case 33 are molded, the plural parts are integrated with each other to form the case 33, depending on the reasons of the molding and assembling.

A first introduction port 36 and a second introduction port 37 are defined in the upper part of the case 33, through which air outside the passenger compartment (outside air) and air inside the passenger compartment (inside air) are introduced into the case 33. Specifically, the first introduction port 36 has two introduction ports, i.e., a first outside air introduction port 36a into which outside air is introduced into the case 33, and a first inside air introduction port 36b into which inside air is introduced into the case 33.

Specifically, the second introduction port 37 has two introduction ports, i.e., a second outside air introduction port 37a into which outside air is introduced into the case 33, and a second inside air introduction port 37b into which inside air is introduced into the case 33. The first outside air introduction port 36a and the second outside air introduction port 37a communicate with an open hole defined in the dash panel, which is not illustrated, and introduce the outside air flowing through the open hole.

The first inside air introduction port 36b is located adjacent to the first outside air introduction port 36a on the vehicle right side (right hand side of FIG. 1). Moreover, the second inside air introduction port 37b is located adjacent to the second outside air introduction port 37a on the vehicle left side (left hand side of FIG. 1).

A partition wall 38 is provided to the upper wall of the case 33, and extends downward to partition inside space of the case 33 into a left space and a right space. The left space and the right space divided by the partition wall 38 respectively construct a first air passage 38a introducing the outside air from the first outside air introduction port 36a and introducing the inside air from the first inside air introduction port 36b to the blower 32, and a second air passage 38b introducing the outside air from the second outside air introduction port 37a and introducing the inside air from the second inside air introduction port 37b to the blower 32.

Therefore, the first air passage 38a and the second air passage 38b are arranged adjacent with each other in the left-and-right direction. A filter (not shown) is arranged in the first air passage 38a and the second air passage 38b, and removes dust from the air flowing from the first outside air introduction port 36a, the second outside air introduction port 37a, the first inside air introduction port 36b, and the second inside air introduction port 37b, so as to purify the air.

The first door 34 is arranged to the first air passage 38a, and switches the first outside air introduction port 36a and the first inside air introduction port 36b to open or close. The first door 34 is a first opening-and-closing part driven by a servo motor 39 for door, and the rotation position and opening is continuously controllable. The first door 34 includes a door main part having a board shape, and is a cantilever door having a rotation shaft at the upper end in a width direction of the door main part. The door main part of the first door 34 has the rectangular plane shape with the rotation shaft, and is made of resin material such as polypropylene or nylon. A sealant (not shown) made from elastic material such as rubber is arranged to periphery edge of the door main part in the frame shape. Therefore, the angle of the first door 34 is continuously changeable from a position where the first outside air introduction port 36a is closed to a position where the first inside air introduction port 36b is closed. The first door 34 can be placed at a position where both of the first outside air introduction port 36a and the first inside air introduction port 36b are opened.

The second door 35 is arranged to the second air passage 38b, and switches the second outside air introduction port 37a and the second inside air introduction port 37b to open or close. The second door 35 is a second opening-and-closing part driven by the same servo motor 39 for door as the first door 34, and the rotation position and opening is continuously controllable. The second door 35 has the same structure as the first door 34. Therefore, the angle of the second door 35 is continuously changeable from a position where the second outside air introduction port 37a is closed to a position where the second inside air introduction port 37b is closed. The second door 35 can be placed at a position where both of the second outside air introduction port 37a and the second inside air introduction port 37b are opened.

The rotation shaft of the first door 34 and the rotation shaft of the second door 35 are connected to the servo motor 39 for door to be driven. The servo motor 39 for door is controlled by a control signal output from the air-conditioning controller 30.

The blower 32 is a centrifugal type blower in which two fans, i.e., a first fan 40a and a second fan 40b are driven to rotate using one common motor 32a for blower as a drive source. The motor 32a for blower is an overhung motor in which a rotation shaft 32b projects only one direction (one side) of the motor body. In the example of FIG. 1, the axis direction of the blower 32 (the extending direction of the rotation shaft 32b) correspond to the up-and-down direction.

The motor 32a for blower may be a direct-current motor or an alternate-current motor. The motor 32a for blower is controlled by a control signal (control voltage or control frequency signal) output from the air-conditioning controller 30. The first fan 40a and the second fan 40b are centrifugal multi-blade fan, and draw air from one side in the axial direction. Specifically, in the first fan 40a and the second fan 40b, plural blades are arranged annularly at a fixed interval around the rotation shaft of the motor 32a for blower. Therefore, the first fan 40a and the second fan 40b are arranged coaxially with each other.

The first fan 40a and the second fan 40b are rotatably accommodated separately in a first scroll casing 41a and a second scroll casing 41b (hereafter may be referred as first casing and second casing) respectively. The first casing 41a and the second casing 41b are made with the same material as the case 33 of the inside/outside air switch device 31, and are integrally combined with the case 33 through a fastening portion such as metal spring, clip, or screw, or a connecting portion such as welding or adhesive.

The first casing 41a has a spiral air passage through which air sent from the first fan 40a passes. Specifically, when the external wall surface of the first casing 41a is seen in a direction perpendicular to the rotation shaft 32b, a distance from the rotation shaft 32b (scroll radius) is gradually increased in the rotation direction of the first fan 40a. A wall of the first casing 41a which is perpendicular to the rotation shaft 32b and far from the motor 32a for blower has a first intake port 42a with circle shape, through which air is drawn toward the inner circumference side of the first fan 40a. Moreover, a first air outlet 43a is defined at the end of the air passage of the first casing 41a, and blows off air.

The second casing 41b has an air passage through which air sent from the second fan 40b passes, and the fundamental structure of the second casing 41b is the same as the first casing 41a. The second casing 41b has a second intake port 42b and a second air outlet 43b, similarly to the first casing 41a.

The second fan 40b is arranged adjacent to the motor 32a for blower than the first fan 40a is, and the second intake port 42b opens to the lower side. The first intake port 42a is located directly under the first outside air introduction port 36a and the first inside air introduction port 36b. Therefore, the first air passage 38a extends approximately straightly downward toward the first intake port 42a from the first outside air introduction port 36a and the first inside air introduction port 36b. The second air passage 38b extends approximately straightly downward from the second outside air introduction port 37a and the second inside air introduction port 37b along and on the side of the first casing 41a and the second casing 41b, then, reaches the second intake port 42b after being bent toward the second casing 41b.

Figure 6:
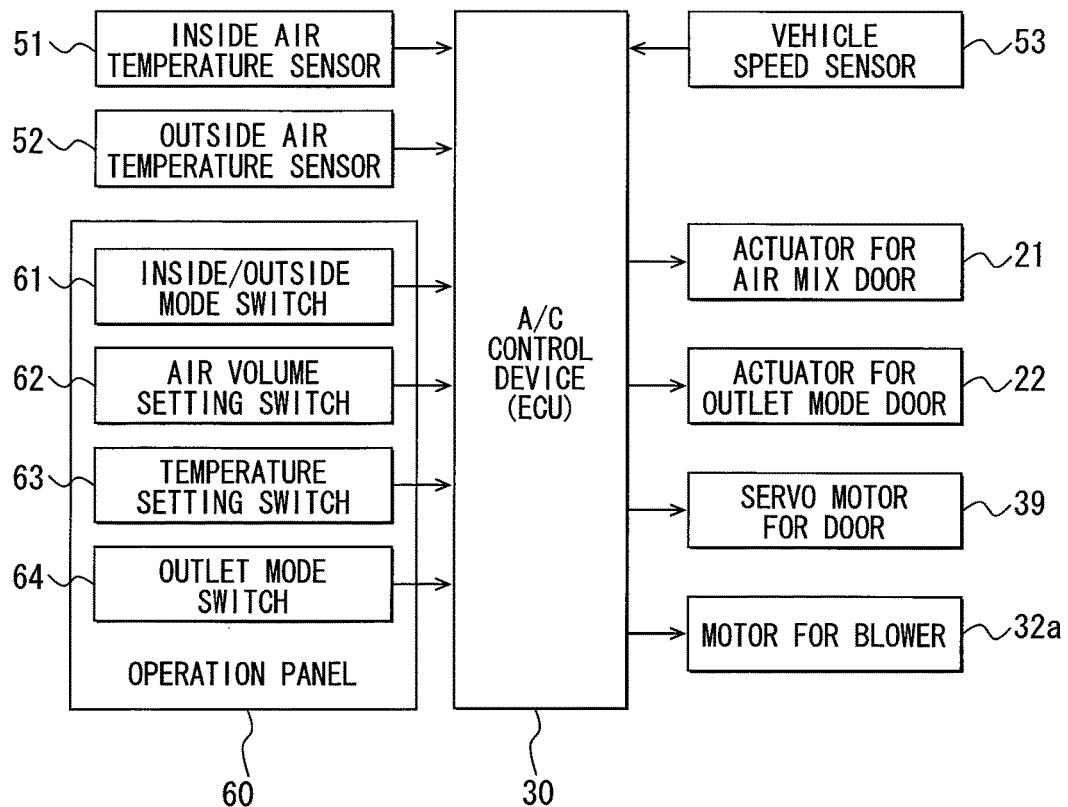
FIG. 6 is a schematic block diagram illustrating an electric construction of an air-conditioner for a vehicle.

Next, the electric construction of the air-conditioner 10 will be described with reference to FIG. 6. The servo motor 39 for door, the actuator 21 for air mix door, the actuator 22 for outlet mode door, and the motor 32a for blower are controlled by the control signal output from the air-conditioning controller 30 (Electronic Control Unit: abbreviated to ECU) which correspond to a control part.

The ECU 30 is constructed by a well-known microcomputer including CPU, ROM, RAM, etc., and its peripheral circuit, and performs various calculations and processing based on an air-conditioning control program memorized in the ROM, so as to control the air-conditioning control instrument connected to the output side.

Sensors such as an inside air temperature sensor 51 which detects inside air temperature, an outside air temperature probe 52 which detects outside air temperature, and a speed sensor 53 which detects the vehicle speed are connected to the input side of the ECU 30. Moreover, manipulate signals output from various air-conditioning operation switches arranged in an operation panel 60 located near the instrument board are input into the input side of the ECU 30. The various air-conditioning operation switches of the operation panel 60 are, for example, an inside/outside air introduction mode switch 61 for switching the inside/outside air introduction mode, an air volume setting switch 62 for the blower 32, a temperature setting switch 63 for setting the temperature in the passenger compartment, and an outlet mode switch 64 for switching the air outlet mode.

Next, operations will be described. When an occupant operates the inside/outside air introduction mode switch 61 of the operation panel 60, or by the ECU 30, one mode is selected and set from an inside-and-outside air two layer mode (refer to FIG. 3), an inside air mode (refer to FIG. 2), an outside air mode (refer to FIG. 1), a first middle mode (refer to FIG. 4) and a second middle mode (refer to FIG. 5).

Figures 9, 10:
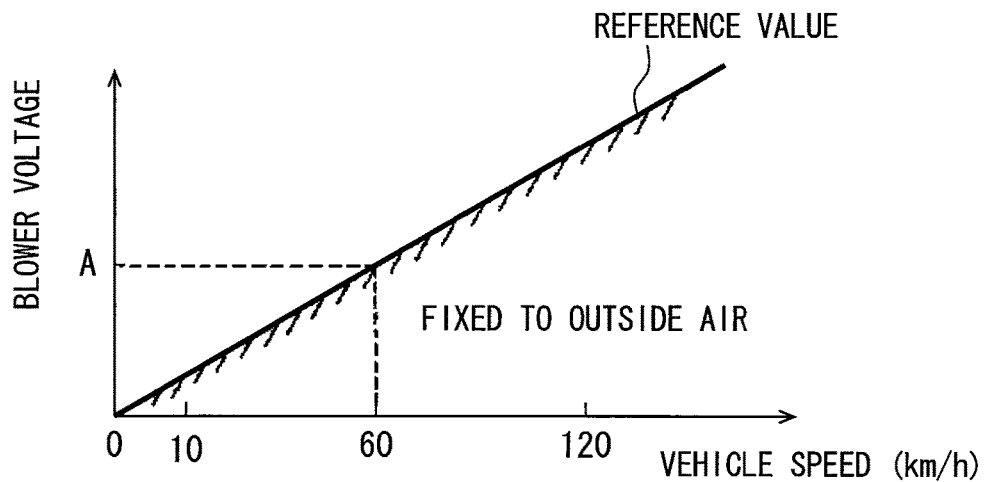
FIG. 9 is a graph illustrating a reference value based on a relationship between a vehicle speed and a blower voltage.
FIG. 10 is a chart illustrating a relationship between a pulse value of a servo motor for door and a door position.

The door position (open/close state) of the first door 34 and the second door 35 is controlled by the servo motor 39 for door based on a pulse value provided from the ECU 30. The first door 34 and the second door 35 are interlocked to operate in conjunction, because the positions of the two door, i.e., the first door 34 and the second door 35, are controlled by the one servo motor 39 for door. In the present embodiment, the first door 34 and the second door 35 are not displaced simultaneously. When the first door 34 is driven, the second door 35 is stopped. When the second door 35 is operating, the first door 34 is stopped. Specific relationship between the pulse value of the servo motor 39 for door and the door position is shown in FIG. 10. Moreover, FIG. 7 shows the graph illustrating the relationship between the pulse value and the control mode.

Figure 3:
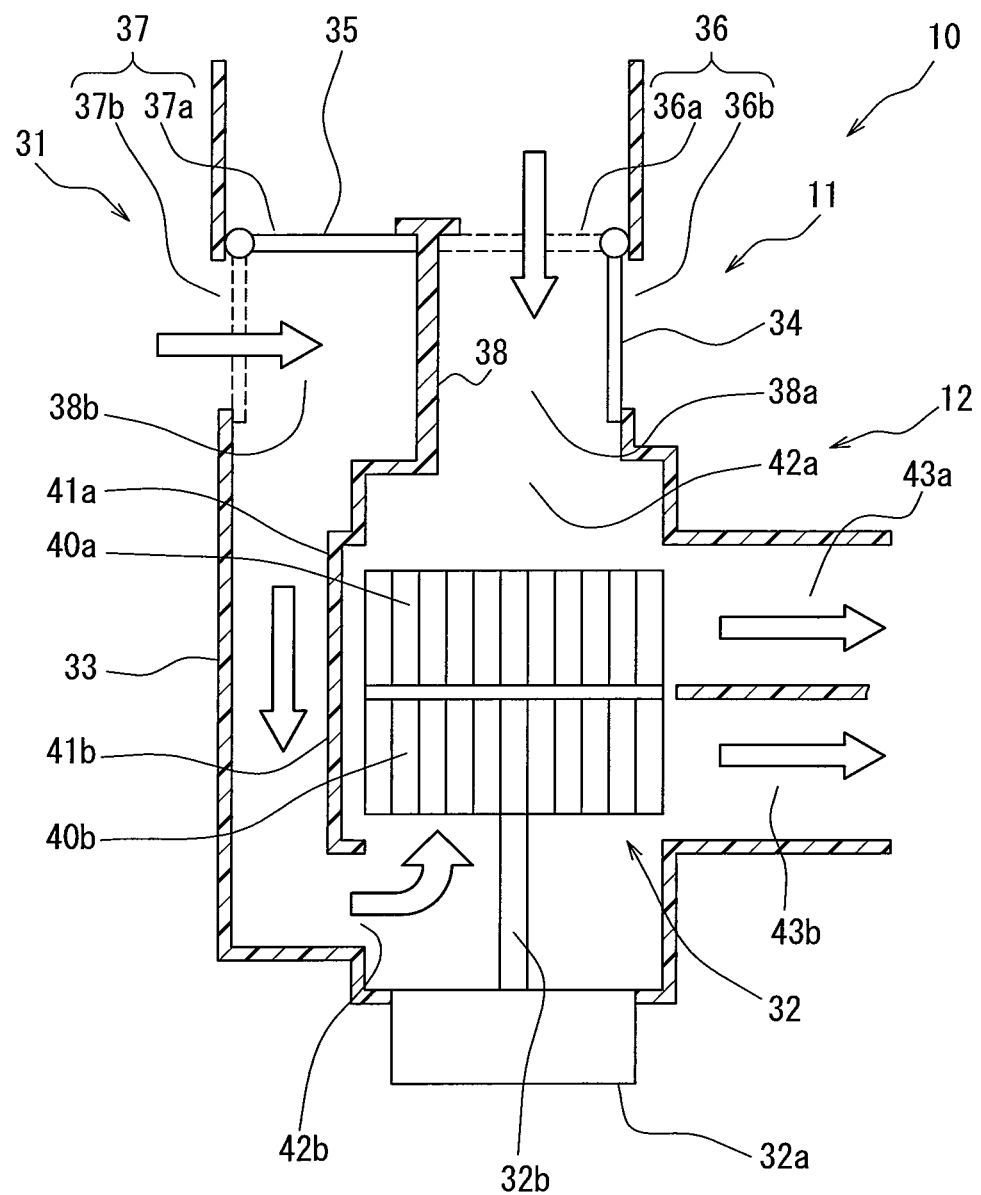
FIG. 3 is a cross-sectional view illustrating a state of an air-conditioner for a vehicle at a two-layer mode.
Figure 5:
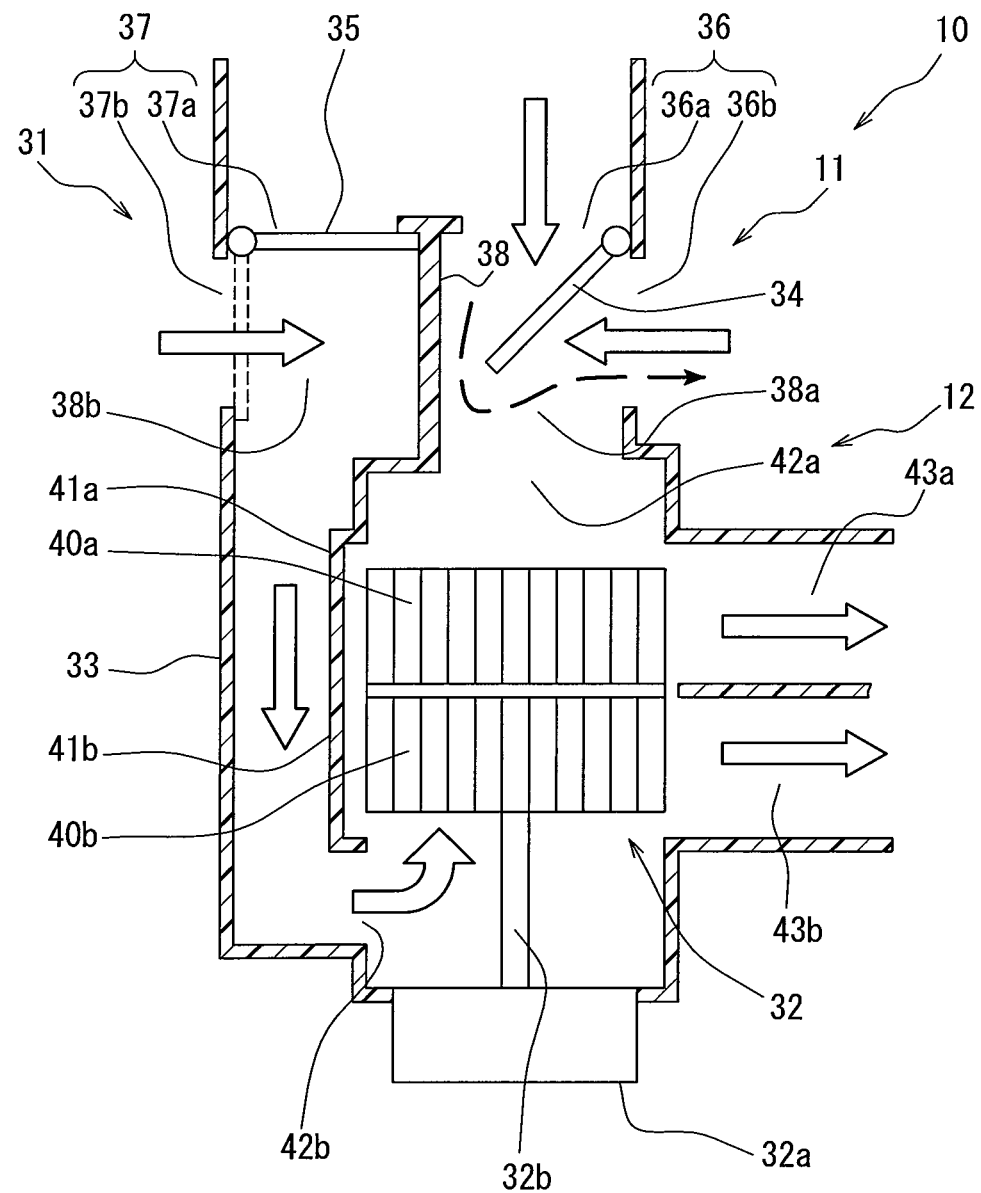
FIG. 5 is a cross-sectional view illustrating a state of an air-conditioner for a vehicle at a second middle mode.
Figure 7:
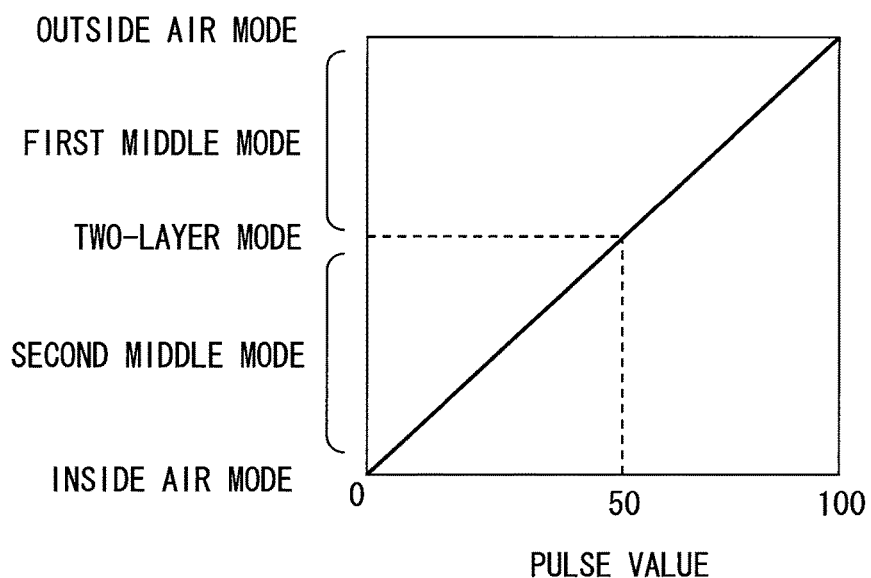
FIG. 7 is a graph illustrating a relationship between a pulse value of a servo motor for door and a control mode.

As shown in FIG. 10 and FIG. 7, the pulse position is an integer larger than or equal to 0 and smaller than or equal to 100. When the pulse value is 0, the inside air mode is set, and the first door 34 and the second door 35 close the first outside air introduction port 36a and the second outside air introduction port 37a, respectively. When the pulse value is set larger than 0 up to 49, the first door 34 is gradually displaced such that both the first outside air introduction port 36a and the first inside air introduction port 36b are opened. In the case where the pulse value is 1-49, because the second door 35 closes the second outside air introduction port 37a, the second middle mode is set as shown in FIG. 5. When the pulse value is set to 50, the first door 34 closes the first inside air introduction port 36b, and the second door 35 closes the second outside air introduction port 37a, so the inside-and-outside two layer mode is set as shown in FIG. 3.

Figure 4:
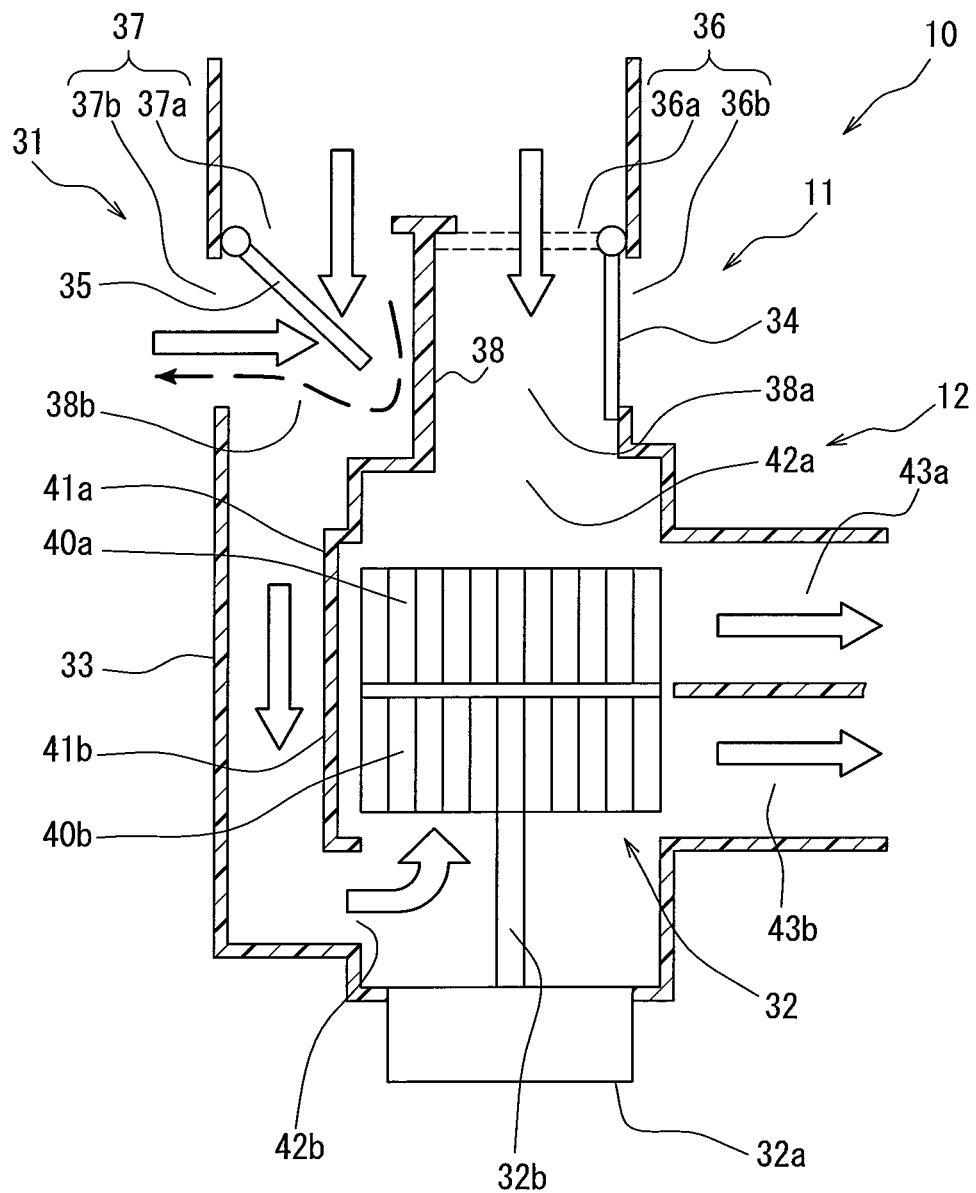
FIG. 4 is a cross-sectional view illustrating a state of an air-conditioner for a vehicle at a first middle mode.

The pulse value is set larger than 50 up to 99, the second door 35 is gradually displaced, and both the second outside air introduction port 37a and the second inside air introduction port 37b are opened. When the pulse value is 51-99, because the first door 34 closes the first inside air introduction port 36b, the first middle mode is set as shown in FIG. 4. When the pulse value is set to 100, the second door 35 closes the second inside air introduction port 37b, and the first door 34 closes the first inside air introduction port 36b, so the outside air mode is set as shown in FIG. 1. A backflow preventing mode shown in FIG. 10 will be described later.

When the air-conditioner 10 is activated, the air-conditioning controller 30 outputs a control signal to the motor 32a for blower, so as to rotate the motor 32a for blower. The first fan 40a and the second fan 40b are rotated by the rotation power from the motor 32a for blower, so as to send air toward the passenger compartment.

Specifically, in the first fan 40a, air is drawn from the first intake port 42a in the axis direction and is blown off outward in the radial direction toward the air conditioning unit from the first air outlet 43a. On the other hand, in the second fan 40b, air is drawn from the second intake port 42b in the axis direction and is blown off outward in the radial direction toward the air conditioning unit from the second air outlet 43b.

The air-conditioning controller 30 determines to select the inside air mode, the outside air mode, the inside-and-outside two-layer mode, the first middle mode, or the second middle mode according to a target temperature of the air to be sent into the passenger compartment. The air-conditioning controller 30 outputs a control signal to the servo motor 39 for door according to the air inlet mode.

As shown in FIG. 1, at the outside air mode in which outside air is introduced in the indoor unit 11, the first door 34 opens the first outside air introduction port 36a and closes the first inside air introduction port 36b, and the second door 35 opens the second outside air introduction port 37a and closes the second inside air introduction port 37b. Thereby, outside air is introduced from the first outside air introduction port 36a and the second outside air introduction port 37a to the first intake port and the second intake port 42b, then, is sent to the air conditioning unit from the first air outlet 43a and the second air outlet 43b.

When the air outlet mode is the defroster mode, for example, the defroster door opens the defroster opening, the face door closes the face opening, and the foot door closes the foot opening. The blow-off air from the first fan 40a and the second fan 40b is blown off from the defroster opening toward the windshield of the vehicle. Therefore, at the outside air mode where outside air is blown off as conditioned-air having a predetermined temperature, humidity of the air blown toward the windshield of the vehicle can be made the lowest, so as to raise the anti-fogging properties of the windshield of the vehicle.

Figure 2:
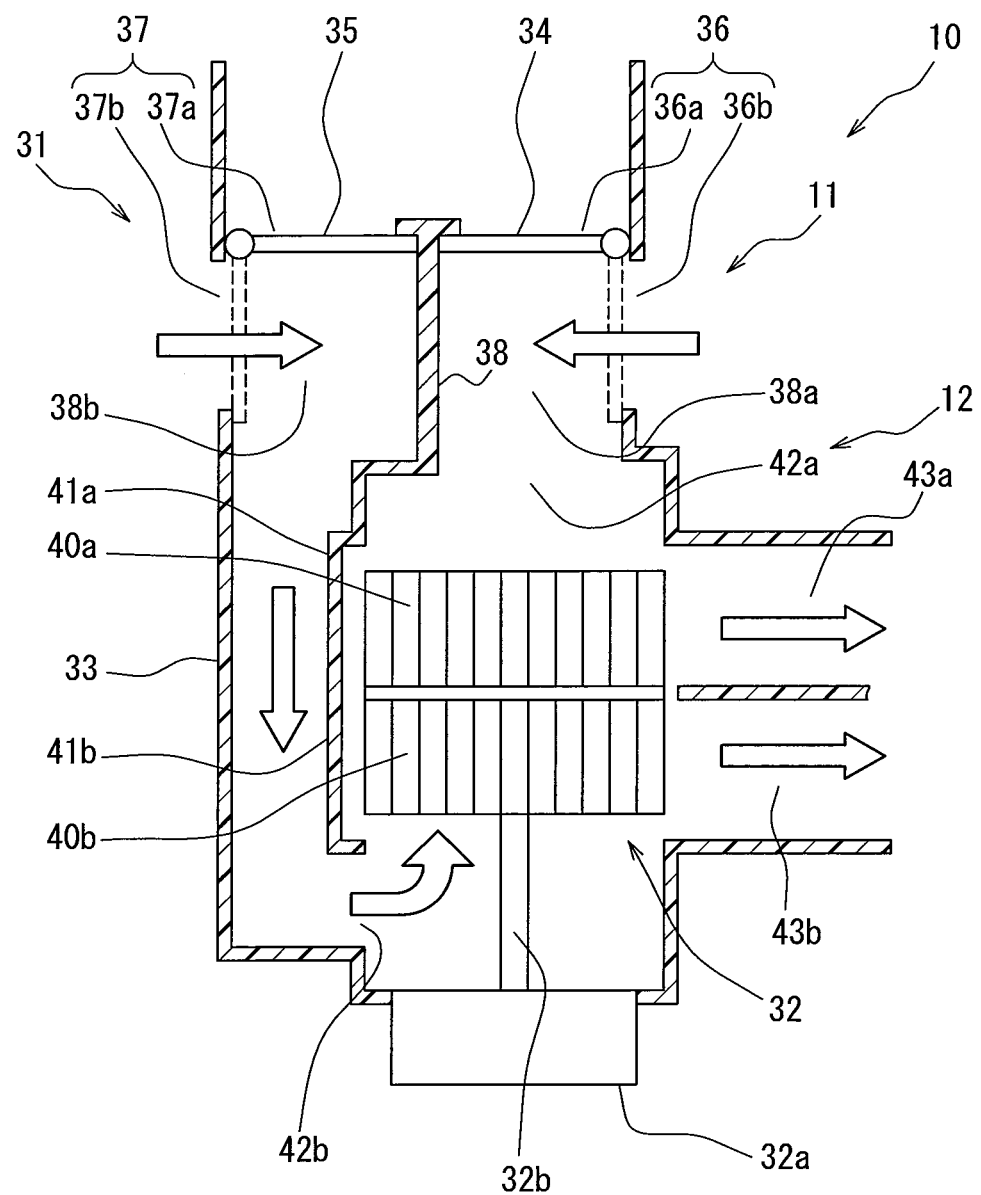
FIG. 2 is a cross-sectional view illustrating a state of an air-conditioner for a vehicle at an inside air mode.

As shown in FIG. 2, at the inside air mode in which inside air is introduced in the indoor unit 11, contrary to the outside air mode, the first door 34 closes the first outside air introduction port 36a and opens the first inside air introduction port 36b, and the second door 35 closes the second outside air introduction port 37a and opens the second inside air introduction port 37b. Thereby, inside air is introduced to the first intake port 42a and the second intake port 42b from the first inside air introduction port 36b and the second inside air introduction port 37b, then, is sent to the air conditioning unit from the first air outlet 43a and the second air outlet 43b.

When the air outlet mode is the foot mode, for example, the defroster door closes the defroster opening, the face door closes the face opening, and the foot door opens the foot opening. The blow-off air from the first fan 40a and the second fan 40b is blown from the foot opening toward an occupant. Therefore, in the inside air mode where inside air is blown off as conditioned air with a predetermined temperature, the air passage of the case 33, the first fan 40a, the second fan 40b, the evaporator, and the heater core can be used effectively as a whole, such that the air conditioning efficiency can be raised the most.

The inside-and-outside two-layer mode shown in FIG. 3 is a mode mainly set in winter. As shown in FIG. 3, at the inside-and-outside two-layer mode where outside air is sent by the first fan 40a and inside air is sent by the second fan 40b, the first door 34 opens the first outside air introduction port 36a and closes the first inside air introduction port 36b, and the second door 35 closes the second outside air introduction port 37a and opens the second inside air introduction port 37b. By this, outside air is introduced to the first intake port 42a from the first outside air introduction port 36a, then, is sent from the first air outlet 43a to the air conditioning unit, and inside air is introduced to the second intake port 42b from the second inside air introduction port 37b, then, is sent from the second air outlet 43b to the air conditioning unit.

When the air outlet mode is the foot defroster mode, for example, the defroster door opens the defroster opening, the face door closes the face opening, and the foot door opens the foot opening. Thereby, the blow-off air from the first fan 40a is blown from the defroster opening toward the windshield of the vehicle. The blow-off air from the second fan 40*b* is blown from the foot opening toward an occupant.

Thereby, the humidity of the air blown toward the windshield of the vehicle is lowered to improve the anti-fogging properties of the windshield of the vehicle. Further, the air condition degree of the air blown toward an occupant is raised (the temperature is raised at a heating time) so as to increase the comfortableness of the occupant.

As shown in FIG. 4, at the first middle mode where outside air is sent by the first fan 40*a* and inside air and outside air are sent by the second fan 40*b*, the first door 34 opens the first outside air introduction port 36*a* and closes the first inside air introduction port 36*b*, and the second door 35 is located at the intermediate position so as to open the second outside air introduction port 37*a* and the second inside air introduction port 37*b*. By this, outside air is introduced to the first intake port 42*a* from the first outside air introduction port 36*a*, then, is sent from the first air outlet 43*a* to the air conditioning unit, and inside air and outside air are introduced to the second intake port 42*b* from the second inside air introduction port 37*b*, then, is sent from the second air outlet 43*b* to the air conditioning unit. Thereby, as effect of middle between the outside air mode and the inside-and-outside two-layer mode, the anti-fogging properties is raised compared with the inside-and-outside two-layer mode, and the air conditioning degree for an occupant can be raised compared with the outside air mode.

As shown in FIG. 5, at the second middle mode where outside air and inside air are sent by the first fan 40*a* and inside air is sent by the second fan 40*b*, the first door 34 is arranged at the intermediate position so as to open the first outside air introduction port 36*a* and the first inside air introduction port 36*b*, and the second door 35 closes the second outside air introduction port 37*a* and opens the second inside air introduction port 37*b*. By this, inside air and outside air are introduced to the first intake port 42*a* from the first outside air introduction port 36*a*, then, is sent from the first air outlet 43*a* to the air conditioning unit, and inside air is introduced to the second intake port 42*b* from the second inside air introduction port 37*b*, then, is sent from the second air outlet 43*b* to the air conditioning unit. Thereby, as effect of middle between the inside air mode and the inside-and-outside two-layer mode, the anti-fogging properties is raised compared with the inside air mode, and the air conditioning degree for an occupant can be raised compared with the inside-and-outside two-layer mode.

Figure 8:
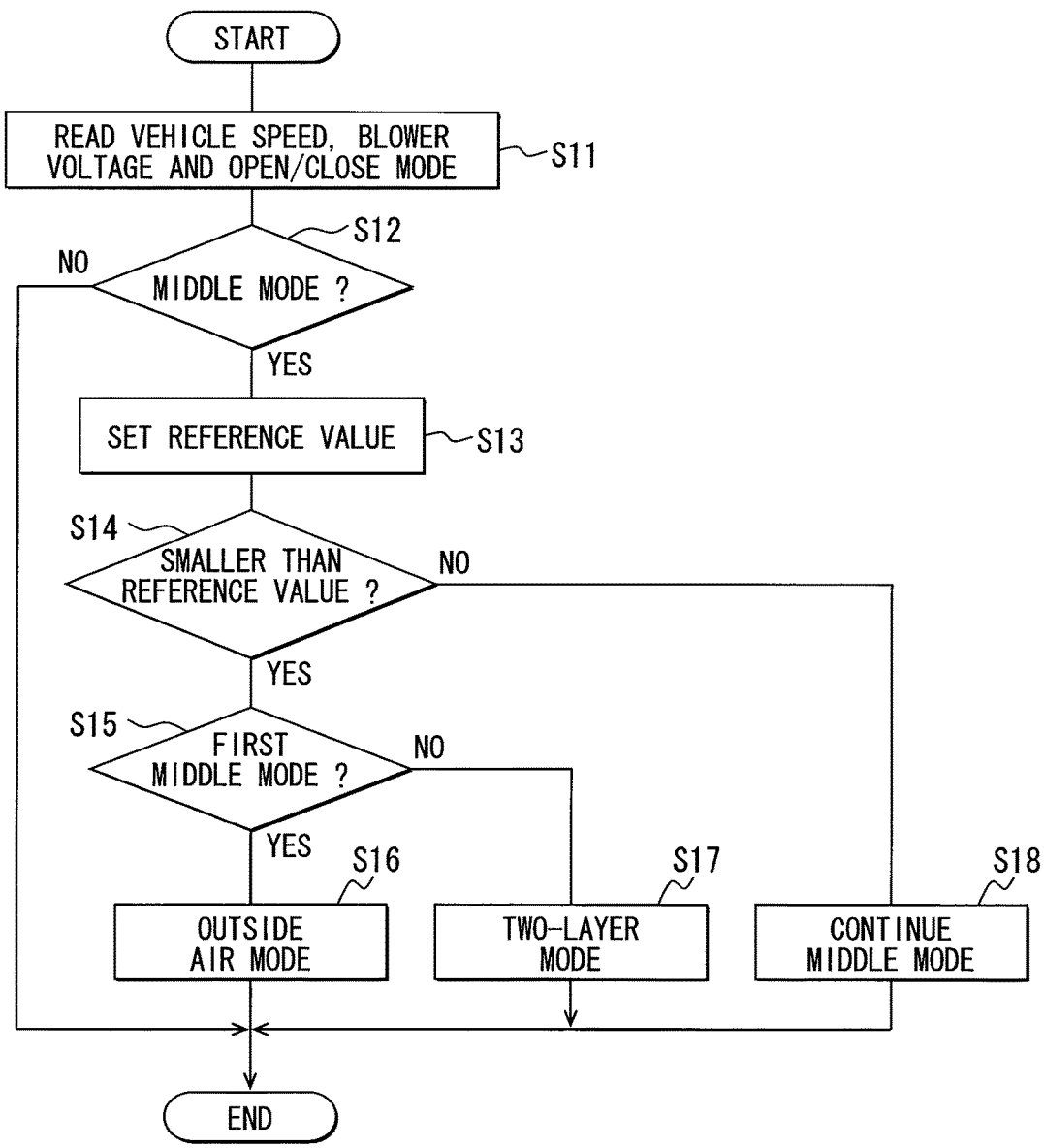
FIG. 8 is a flow chart illustrating a backflow prevention process.

Next, the backflow prevention process by the ECU 30 is explained using FIG. 8. First, backflow is explained. Like the first middle mode (refer to FIG. 4) and the second middle mode (refer to FIG. 5), when the first door 34 or the second door 35 is arranged at the intermediate position where inside air and outside air can be introduced, if the travel speed of the vehicle becomes high, a large pressure is applied to the upstream part of each of the outside air introduction ports 36*a*, 37*a*, as a result, as shown in a broken-line arrow direction of FIG. 4 and FIG. 5, a backflow of the outside air is generated such that the outside air flows through the inside air introduction port 36*b*, 37*b*. The backflow of the outside air will be gradually blown off toward an occupant in the passenger compartment as it is, without being air-conditioned. The backflow prevention process is a control for preventing such a backflow.

FIG. 8 is a flowchart showing the backflow prevention process. The backflow prevention process is executed when the opening-and-closing mode is determined relative to the positions of the first door 34 and the second door 35. Moreover, the backflow prevention process is performed periodically in the ignition-on state.

At Step S11, the vehicle speed output from the speed sensor 53, the motor voltage presently applied to the motor 32*a* for blower, and the present pulse value of the servo motor 39 for door are read, and it moves to Step S12.

At Step S12, it is determined whether the present opening-and-closing mode is the first middle mode or the second middle mode (they may be named generically as "middle mode") based on the read pulse value. When the opening-and-closing mode is the middle mode, it moves to Step S13. In a case not in the middle mode, the backflow does not occur, so the present flow is ended.

At Step S13, a reference value for preventing a backflow is set for the middle mode, and it moves to Step S14. The reference value is explained here. The reference value is set so that a pressure difference between an air pressure at the upstream part of the outside air introduction port 36*a*, 37*a* (outside air pressure) and an air pressure at the upstream part of the inside air introduction port 36*b*, 37*b* (inside air pressure) becomes equal to a pressure difference between the outside air pressure and an air pressure at the air passage (passage pressure). FIG. 9 is a graph illustrating the reference value. The reference value is calculated based on the vehicle speed and the blower voltage (motor voltage). Specifically, the vehicle speed has a close relationship with the outside air pressure, and the blower voltage has a close relationship with the passage pressure. Therefore, the pressure difference between the outside air pressure and the passage pressure can be known from these two parameters. Moreover, as to the pressure difference between the outside air pressure and the inside air pressure, the inside air pressure at the upstream part of the inside air introduction port 36*b*, 37*b* is almost the same as an air pressure in the passenger compartment, so atmospheric pressure can be used as the inside air pressure. Therefore, the pressure difference between the outside air pressure and the inside air pressure can be known if the outside air pressure is known. Thus, in FIG. 9, for example, if the vehicle speed is 60 km/h, the blower voltage is set into a first voltage A, such that the pressure difference between the outside air pressure and the inside air pressure will become exactly equal to the pressure difference between the outside air pressure and the passage pressure. Accordingly, as a method of setting the reference value, the reference value is calculated based on the characteristics shown in FIG. 9 and memorized in the ROM of the ECU 30 and the vehicle speed read at Step S11. For example, when the vehicle speed is 60 km/h, the reference value is the first voltage A in FIG. 9.

At Step S14, it is determined whether the presently read voltage of the blower 32 is smaller than the reference value. When the present blower voltage is smaller than the reference value, it moves to Step S15. When the present blower voltage is not smaller than the reference value, it moves to Step S18. When the present blower voltage is smaller than the reference value, possibility that a backflow will occur is high because the power of the blower 32 drawing the outside air is weak. Thus, it can be determined whether a backflow occurs at Step S14. The air-conditioning controller 30 works as a first determining part which determines whether the outside air introduced from the first outside air introduction port 36*a* flows (backward) into the passenger compartment through the first inside air introduction port 36*b*, when both the first outside air introduction port 36*a* and the first inside air introduction port 36*b* are in the open state. Moreover, the air-conditioning controller 30 works as a second determining part which determines whether the outside air introduced from the second outside air introduction port 37*a* flows (backward) into the passenger compartment through the second inside air introduction port 37*b*, when both the second outside air introduction port 37*a* and the second inside air introduction port 37*b* are in the open state.

At Step S15, it is determined whether the opening-and-closing mode is the first middle mode or not, so as to shift to the backflow prevention mode, because there is a possibility that a backflow may occur. In the case of the first middle mode, it moves to Step S16. In the case not in the first middle mode, it moves to Step S17.

At Step S16, the pulse value of the servo motor 39 for door is set to 100 so as to shift to the outside air mode as the backflow prevention mode for the first middle mode (refer to FIG. 10), and the present flow is ended. At Step S17, the pulse value of the servo motor 39 for door is set to 50 so as to shift to the inside-and-outside two-layer mode as the backflow prevention mode for the second middle mode, (refer to FIG. 10), and the present flow is ended. At Step S18, it is determined that a backflow does not occur, and the present middle mode is continued, then, the present flow is ended.

Thus, in the backflow prevention process, the middle mode is shifted to the outside air mode or the inside-and-outside two-layer mode when a backflow occurs or when there is a possibility that a backflow may occur according to the pressure difference. A backflow is not generated in the outside air mode and the inside-and-outside two-layer mode, so the backflow can be surely prevented from being generated. In the case of the first middle mode, the first middle mode is shifted to the outside air mode to prevent backflow, and in the case of the second middle mode, the second middle mode is shifted to the inside-and-outside two-layer mode to prevent backflow. Thus, the opening-and-closing mode shifts in a direction increasing the outside air, and the shift is effective to improve the anti-fogging properties. For example, in an environment where the outside air temperature is low in winter, a fogging may be easily generated on the windshield. As the backflow prevention mode, it is more desirable to shift the mode in a direction increasing the amount of outside air, rather than the present state.

Moreover, the opening-and-closing mode to be shifted to is not restricted to the opening-and-closing mode of the present flow. In the case of the first middle mode, it may be shifted to the inside-and-outside two-layer mode to prevent backflow, and in the case of the second middle mode, it may be shifted to the inside air mode to prevent backflow. In this case, the opening-and-closing mode shifts in a direction increasing the inside air, so the shift is effective to improve air conditioning efficiency.

Moreover, in the case of the first middle mode, it may be shifted to the inside-and-outside two-layer mode to prevent backflow, and in the case of the second middle mode, it may also be shifted to the inside-and-outside two-layer mode to prevent backflow. It is effective to secure both of the anti-fogging properties and the air conditioning efficiency.

Moreover, when it is determined that a backflow will occur, the air-conditioning controller 30 may control each door to close an introduction port where a time period taken for closing after the each door starts operating is shorter, of the outside air introduction port 36*a*, 37*a* and the inside air introduction port 36*b*, 37*b*. In other words, the opening-and-closing mode to be shifted to may be determined based on the pulse value of the middle mode. Specifically, it is desirable to finish shifting to the backflow prevention mode for the shortest time period. Therefore, for example, when the pulse value is higher than or equal to 51 and smaller than or equal to 75, the first middle mode may shift to the inside-and-outside two-layer mode. When the pulse value is higher than or equal to 76 and smaller than or equal to 99, the first middle mode may shift to the outside air mode. When the pulse value is higher than or equal to 26 and smaller than or equal to 49, the second middle mode may shift to the inside-and-outside two-layer mode. When the pulse value is higher than or equal to 1 and smaller than or equal to 25, the second middle mode may shift to the inside air mode. Thus, the time period taken from the determination that a backflow occurs to the set of the backflow prevention mode can be shortened. Therefore, the generation of the backflow can be quickly prevented. Moreover, in a case where noise is generated while the actuator is operating, the noise generation time period can be shortened. Moreover, the power necessary for operating the actuator can also be reduced.

As shown in FIG. 9, the data for the reference value are obtained in advance through experiments etc. by setting the blower voltage relative to a certain vehicle speed such that the pressure differences become equal with each other. The data are memorized in the ROM to set up the reference value. Moreover, although the outside air pressure is estimated based on the vehicle speed, a pressure sensor may be actually provided to the upstream part of the outside air introduction port, and a signal output from the pressure sensor may be used. The inside air pressure and the passage pressure may be similarly detected using such a pressure sensor.

As explained above, in the case 33 of the air-conditioner 10 according to the present embodiment, the first air passage 38*a* extending toward the first fan 40*a* from the first outside air introduction port 36*a* and the first inside air introduction port 36*b*, and the second air passage 38*b* extending toward the second fan 40*b* from the second outside air introduction port 37*a* and the second inside air introduction port 37*b* are defined independently from each other. Because the first air passage 38*a* and the second air passage 38*b* are formed independently from each other, the ratio between the outside air and the inside air can be individually adjusted in each of the air passages 38*a*, 38*b* by each of the doors 34, 35. However, when both the outside air introduction port 36*a*, 37*a* and the inside air introduction port 36*b*, 37*b* are in the open state, the pressure of the introduced outside air becomes high due to the rise of in the vehicle speed, etc., and there is a possibility that the outside air introduced from the outside air introduction port 36*a*, 37*a* may flow into the passenger compartment through the inside air introduction ports 36*b*, 37*b* (what is called a backflow). The air-conditioning controller 30 determines whether such a backflow will occur or not. When it is determined that a backflow occurs in the first air passage 38*a*, the air-conditioning controller 30 controls the first door 34 to close either one of the first outside air introduction port 36*a* and the first inside air introduction port 36*b*. Because one of the introduction ports is closed, the backflow can be prevented. Similarly, when it is determined that a backflow occurs in the second air passage 38*b*, the air-conditioning controller 30 controls the second door 35 to close either one of the second outside air introduction port 37*a* and the second inside air introduction port 37*b*. Because one of the introduction ports is closed, the backflow can be prevented.

Furthermore, in the present embodiment, in the case where it is determined that outside air flows out of the first inside air introduction port 36*b*, when the second outside air introduction port 37*a* is in the closed state by the second door 35, (namely, when it is in the second middle mode), the air-conditioning controller 30 controls the first door 34 to close the first inside air introduction port 36b (namely, the inside-and-outside two-layer mode is set). It is effective for the anti-fogging of the windshield to ventilate air with much outside air from the first fan 40a. Moreover, in order to improve the air conditioning efficiency, it is desirable to increase the ratio of the inside air which is the already-conditioned air. Then, in the present embodiment, the inside air is introduced into the passenger compartment because the second outside air introduction port 37a is closed by the second door 35. In the case where a backflow may be generated in the first air passage 38a, the first inside air introduction port 36b is closed by the air-conditioning controller 30 to secure the anti-fogging properties in addition to the backflow prevention. Thus, the backflow can be prevented, the air conditioning efficiency can be restricted from declining, and the anti-fogging effect can be attained.

Moreover, in the present embodiment, in the case where it is determined that outside air flows out of the second inside air introduction port 37b, when the first inside air introduction port 36b is in the closed state by the first door 34 (namely, when it is in the second middle mode), the air-conditioning controller 30 controls the second door 35 to close the second inside air introduction port 37b (namely, the outside air mode is set). It is effective for immediate prevention and elimination of the windshield fogging to ventilate air with much outside air into the passenger compartment not only from the first fan 40a but also from the second fan 40b. Then, in the present embodiment, when a backflow may occur in the second air passage 38b, the second inside air introduction port 37b is closed by the second door 35. Thus, a backflow can be prevented, and the anti-fogging effect can be attained by introducing outside air from the two outside air introduction ports 36a and 37a.

Moreover, in the present embodiment, the first door 34 and the second door 35 are driven with the one servo motor 39 for door. Because the two doors are driven by one drive source, the construction can be simplified rather than a construction where a drive source is individually provided. Moreover, because they are driven by the one servo motor 39 for door, the doors 34, 35 cannot be operated individually. However, the operation time can be prevented from becoming long because the backflow prevention mode is set to be an opening-and-closing mode close to each middle mode.

The air-conditioner 10 having the above-described inside-and-outside air two-layer unit has the following advantages, mainly in a winter season. A first advantage is to improve the heating performance by the circulation of inside air blown to the foot part in the front seat where the anti-fogging properties are maintained. A second advantage is to improve the fuel consumption by raising the ratio of inside air to restrict the temperature of the engine cooling water from falling, especially by lowering the engine operation to keep the temperature of the engine cooling water high in a HV car or EV car. Therefore, in order to maintain these effects, it is desirable to maintain the inside-and-outside two-layer mode as much as possible. In a conventional mode, the backflow prevention mode is always set to the outside air mode, so the above effects will be spoiled in all the use ranges. However, according to the present embodiment, the backflow can be prevented by maintaining the inside-and-outside two-layer mode depending on the environmental condition, therefore, both the backflow prevention effect and the effect of the inside-and-outside two-layer mode can be attained. Moreover, in the drive of the servo motor 39 for door, the backflow prevention mode is kept to the inside-and-outside two-layer mode according to the environment, so the operation time to the backflow prevention mode can be shortened rather than setting the outside air mode. The change in the air flow direction and the sound of the HVAC operation caused by switching the opening-and-closing mode can be reduced. Moreover, the power consumption for driving the servo motor can be reduced.

The present disclosure is not limited to the above embodiment, and can be modified in the scope of the present disclosure.

In the embodiment, the first air passage 38a and the second air passage 38b are formed independently from each other. However, it means not only strict independence but also includes substantial independence. That is, the first air passage 38a and the second air passage 38b may communicate with each other through a minute gap.

Moreover, in the embodiment, it is determined whether the outside air introduced from the outside air introduction ports 36a, 37a flows into the passenger compartment through the inside air introduction ports 36b, 37b based on the outside air pressure, the inside air pressure, and the passage pressure, but it is not restricted to such a determination method. For example, it may be determined according to the air flow direction at the inside air introduction port 36b, 37b, or may be determined based on only the vehicle speed simply.

Moreover, in the embodiment, although the first door 34 and the second door 35 are made of the board door, they are not limited. For example, a rotary door may be used, a slide door may be used, or a film door may be used.

Moreover, in the embodiment, although the first door 34 and the second door 35 are driven by the one servo motor 39 for door, it is not limited to the one. Alternatively, a servo motor may be provided to each door, and each door may be driven individually. In this case, the door control flexibility can be improved, so the backflow prevention mode can be set in short time.

Moreover, in the embodiment, although the air-conditioning controller 30 detects the positions of the first door 34 and the second door 35 based on the pulse value of the servo motor 39 for door, it is not limited to the pulse value. Alternatively, an item (parameter) used in the other control may be used. For example, the door position may be determined by a detection value which detects the fogging of the windshield.

It is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

The invention claimed is:

1. An air-conditioner for a vehicle comprising:
   a case having a first outside air introduction port and a second outside air introduction port directly adjacent to the first outside air introduction port, which introduce outside air, and a first inside air introduction port and a second inside air introduction port, which introduce inside air;
   a first opening-and-closing part which switches the first outside air introduction port and the first inside air introduction port to open or close and is capable of opening both of the first outside air introduction port and the first inside air introduction port;
   a second opening-and-closing part which switches the second outside air introduction port and the second inside air introduction port to open or close and is capable of opening both of the second outside air introduction port and the second inside air introduction port;

a blower arranged in the case; and a control part which controls an opening-and-closing state of the first opening-and-closing part and an opening-and-closing state of the second opening-and-closing part, wherein the blower has
- a rotation shaft extending in an up-and-down direction in the case,
- a first fan coupled to the rotation shaft, and
- a second fan coupled to the rotation shaft on a lower side rather than the first fan, the case has a first air passage extending toward the first fan from the first outside air introduction port and the first inside air introduction port and a second air passage extending toward the second fan from the second outside air introduction port and the second inside air introduction port independently from each other, at least a part of air sent from the blower is blown toward an inner surface of a windshield of the vehicle and downward in the passenger compartment, an amount of the air blown toward the inner surface of the windshield is larger by the first fan than that by the second fan, an amount of the air blown downward in the passenger compartment is larger by the second fan than that by the first fan, the control part controls the first opening-and-closing part to close the first inside air introduction port when the second outside air introduction port is closed by the second opening-and-closing part in case where it is determined that the outside air introduced from the first outside air introduction port flows into the passenger compartment through the first inside air introduction port, and the control part controls the second opening-and-closing part to close the second outside air introduction port when the first inside air introduction port is closed by the first opening-and-closing part in case where it is determined that the outside air introduced from the second outside air introduction port flows into the passenger compartment through the second inside air introduction port.

2. The air-conditioner according to claim 1, wherein
the outside air introduced from the first outside air introduction port flows in a direction perpendicularly toward the first fan, and
the outside air introduced from the second outside air introduction port flows in a direction perpendicularly toward the second fan.

3. An air-conditioner for a vehicle comprising:
a case having a first outside air introduction port and a second outside air introduction port, which introduce outside air, and a first inside air introduction port and a second inside air introduction port, which introduce inside air;
a first opening-and-closing part which switches the first outside air introduction port and the first inside air introduction port to open or close and is capable of opening both of the first outside air introduction port and the first inside air introduction port;
a second opening-and-closing part which switches the second outside air introduction port and the second inside air introduction port to open or close and is capable of opening both of the second outside air introduction port and the second inside air introduction port;

a blower arranged in the case; and a control part which controls an opening-and-closing state of the first opening-and-closing part and an opening-and-closing state of the second opening-and-closing part, wherein the blower has
- a rotation shaft extending in an up-and-down direction in the case,
- a first fan coupled to the rotation shaft, and
- a second fan coupled to the rotation shaft on a lower side rather than the first fan, the case has a first air passage extending toward the first fan from the first outside air introduction port and the first inside air introduction port and a second air passage extending toward the second fan from the second outside air introduction port and the second inside air introduction port independently from each other, at least a part of air sent from the blower is blown toward an inner surface of a windshield of the vehicle and downward in the passenger compartment, an amount of the air blown toward the inner surface of the windshield is larger by the first fan than that by the second fan, an amount of the air blown downward in the passenger compartment is larger by the second fan than that by the first fan, the control part controls the first opening-and-closing part to close the first inside air introduction port when the second outside air introduction port is closed by the second opening-and-closing part in case where it is determined that the outside air introduced from the first outside air introduction port flows into the passenger compartment through the first inside air introduction port, and the control part controls the second opening-and-closing part to close the second outside air introduction port when the first inside air introduction port is closed by the first opening-and-closing part in case where it is determined that the outside air introduced from the second outside air introduction port flows into the passenger compartment through the second inside air introduction port.

4. The air-conditioner according to claim 3, wherein the first outside air introduction port is directly adjacent to the second outside air introduction port.

5. The air-conditioner according to claim 3, wherein
the outside air introduced from the first outside air introduction port flows in a direction perpendicularly toward the first fan, and
the outside air introduced from the second outside air introduction port flows in a direction perpendicularly toward the second fan.

* * * * *